Nov. 17, 1970  M. MENDELSON  3,540,222
METHOD OF AERATING STILL BODIES OF WATER
Filed Nov. 18, 1968  2 Sheets-Sheet 1

INVENTOR
MORRIS MENDELSON

BY Hauke, Krase, Gifford, & Patalidis
ATTORNEYS

Nov. 17, 1970     M. MENDELSON     3,540,222

METHOD OF AERATING STILL BODIES OF WATER

Filed Nov. 18, 1968     2 Sheets-Sheet 2

INVENTOR
MORRIS MENDELSON

BY Hauke, Krass, Gifford, & Patalidis
ATTORNEYS

United States Patent Office 3,540,222
Patented Nov. 17, 1970

3,540,222
METHOD OF AERATING STILL BODIES OF WATER
Morris Mendelson, 16156 Oxley,
Southfield, Mich. 48075
Filed Nov. 18, 1968, Ser. No. 776,431
Int. Cl. E02b 3/00
U.S. Cl. 61—1
4 Claims

ABSTRACT OF THE DISCLOSURE

A method of aerating still bodies of water is disclosed herein which comprises the use of a buoy moored in the water for floatation on the surface thereon and which is attached to a mechanical stirring device, such as a valved plate or a propeller suspended from the buoy due to wave action the mechanical stirring device will be set in motion to pump water from near the bottom of the body of water upwardly to the surface but reducing or eleminating any vertical flow of water on the downward movement of the buoy.

BACKGROUND OF THE INVENTION

The present invention relates to a method of aerating bodies of water which are relatively still, that is, such bodies of water which do not have any current flow as distinct from other bodies of water which are continuously supplied by or empty into flowing streams of water or are connected to underground rivers, springs or the like. The water in still bodies of water, if untouched, stagnates and stratifies resulting in cold masses being disposed at or near the bottom of the body of water which are completely out of contact with the oxygen introduced in the surface layer of the water. Such waters become easily polluted due to the bsence of oxygen in the water below a certain depth, making these waters unfit for any intended use.

In essence, the present invention provides a method of stirring up the water below the surface at a certain depth to move the cold masses of water at the bottom of the body upwardly to allow oxygen to be introduced. The particular means by which these substratas of water are moved upwardly are not important, but preferably means are employed which do not have to depend on any power source. These relatively still bodies of water are in many instances found in remote locations where no power means, such as electricity or the like, is available. For this reason, and to eliminate any costly installation and to reduce maintenance to a minimum, means such as wave action motors are preferably employed. Wave action motors are well known in the art and essentially consist of a buoy floating on the surface of the water and having actuating devices depending therefrom below the surface of the water adapted to be actuated by the motion of the buoy caused by the surface waves of the water. Any such well known device may be employed for the purpose of the invention and for the sake of illustration two suggested embodiments are shown in the accompanying drawings. However, their particular structures as mentioned above are not important and do not form any part of the claimed subject matter.

BRIEF DESCRIPTION OF THE DRAWINGS

In the accompanying drawings.

DESCRIPTION OF THE PREFERRED EMBODIMENT

Figure 1:
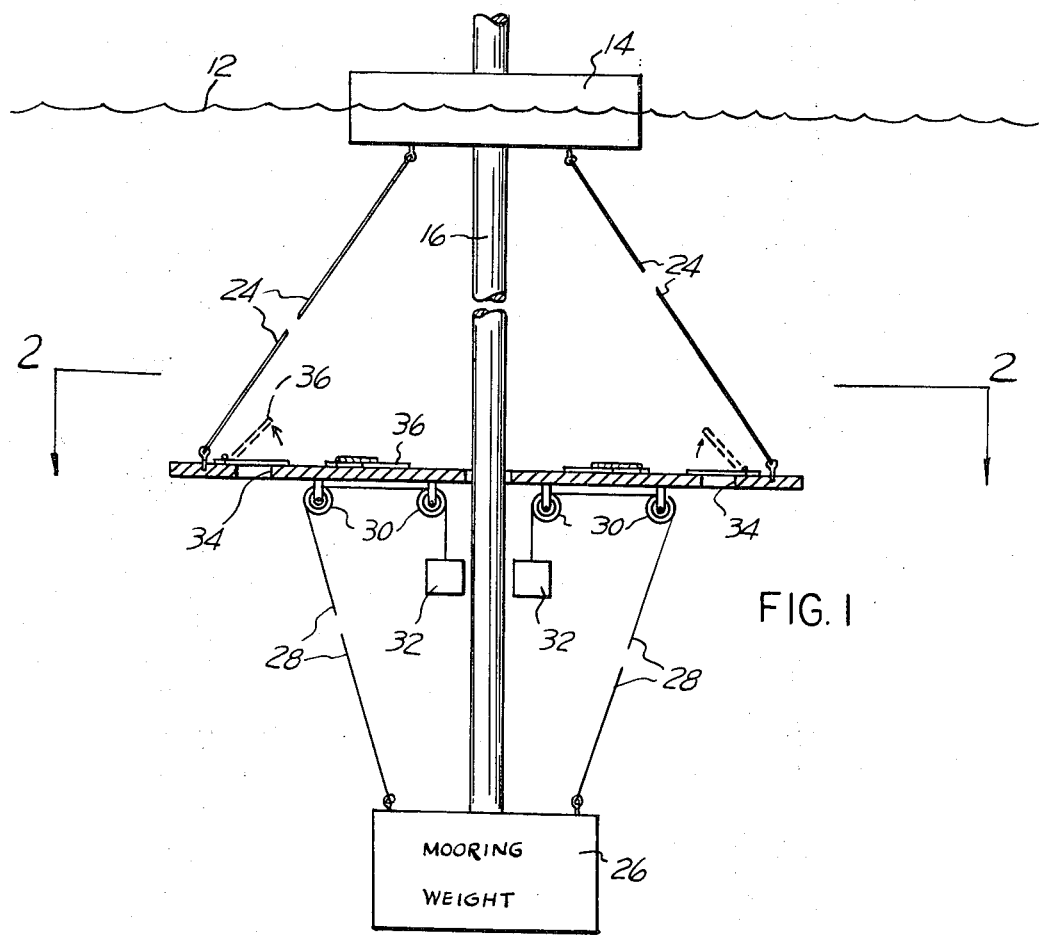
FIG. 1 is an illustrative example of one embodiment of a wave action motor and actuating device which may be used in the present novel method.
Figure 2:
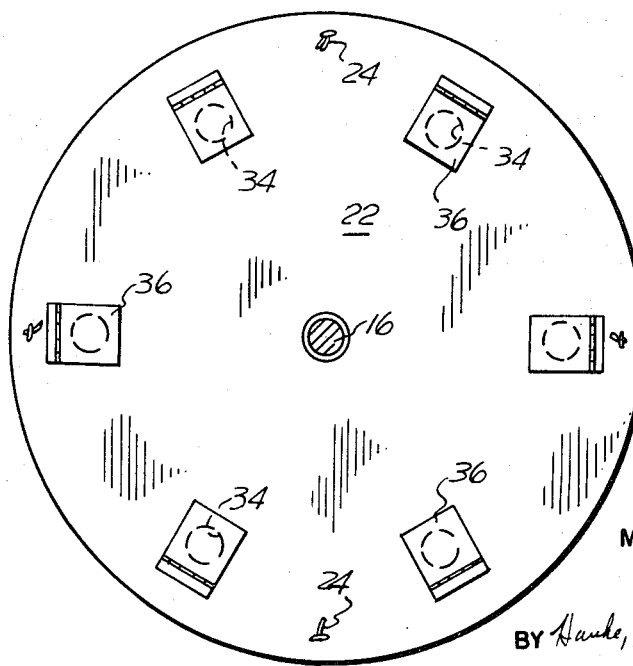
FIG. 2 is a plan view of the suspended plate of FIG. 1.
Figure 3:
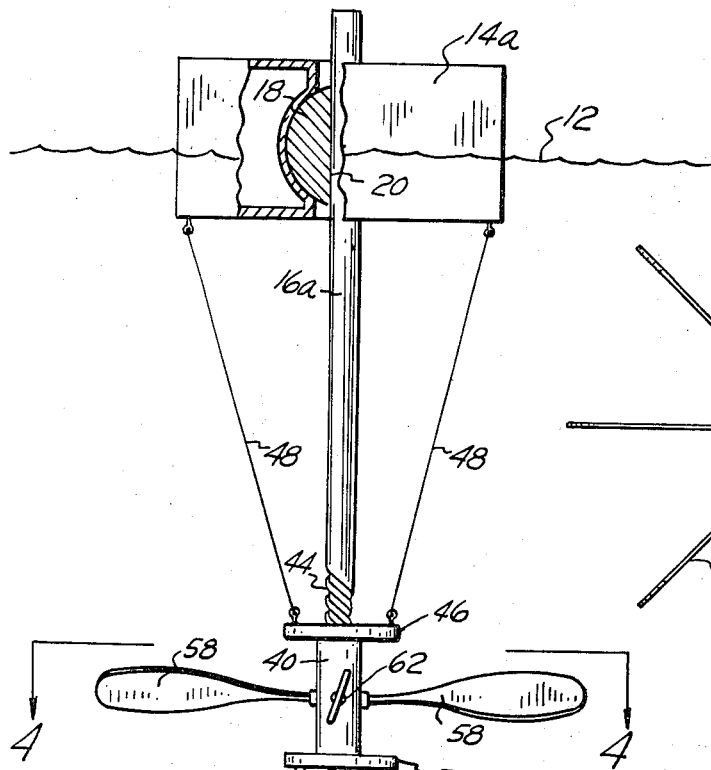
FIG. 3 illustrates another embodiment of a wave action motor which may be employed herein.

In order to accomplish the present novel method of aerating still bodies of water a device as shown in FIGS. 1 and 2 may be employed which illustrates a body of water 10 having a surface 12. Floating on the surface 12 is a buoy 14 suspended around a mooring mast 16 which extends through the center of the buoy. As seen in FIG. 3 buoy 14 may be supported on the mast 15 by means of a spherical bearing 18 or the like having a central aperture 20 through which the mast extends. By this arrangement the buoy can freely float up and down the mast and pivot angularly relative to the mast when set in motion by the waves of the water.

Suspended from the buoy below the surface of the water is a plate 22 of defined dimensions which may be square, rectangular, circular or have any other shape and which is suspended from the buoy by means of cables 24. The mast 16 extends through the center of the plate for free sliding movement of the plate along the mast upon an up and down movement of the buoy 14. The mast 16 is anchored below the plate at a considerable depth below the surface of the water to a mooring weight 26 at or near the bottom of the body of water. The plate 22 which is suspended between the buoy and the mooring weight is likewise attached to the mooring weight by means of cables 28 attached to the mooring weight and extending freely slidable over pulleys 30 attached to the underside of the plate 22. The free ends of the cables 28 are attached to counterweights 32 of relatively small mass but which have sufficient weight to maintain the cables 24 tight upon the downward movement of the buoy 14 on the mast, thus, moving the plate downwardly whenever the buoy moves down. The counterweights 32 are balanced such as not to offer any significant resistance to the upward movement of the buoy and plate as caused by the waves.

As seen in FIG. 2, the plate 22 is provided with a number of circumferentially arranged apertures 34 of a diameter sufficient for the purpose. The apertures 34 are adapted to be alternately opened and closed by means of resilient flaps which are hinged to the plate adjacent the apertures 34.

The device operates in the following manner: When the buoy is raised by the action of the waves, the plate 22 which is suspended from the buoy at a sufficient depth below the surface of the water, will be raised with it. By this action, the water pressure on top of the plate 22 causes the flaps 36 to close apertures 34. Thus, the plate 22 offers a solid resistance body upon an upward movement and thereby moving substratas of masses of cold water upwardly with it, inducing a vertical upward flow and thus displacing stagnant waters from the depth to the surface of the body of water to introduce them to oxygen. As the buoy 14 moves down by the action of the waves the cables 24 slacken and cause the counterweights to draw the plate 22 downwardly on the mast 16. Upon downward movement of the plate 22 the water pressure on the underside of the plate is higher than the water pressure on top of the plate causing the flaps 36 to crack open and thus releasing some of the pressure through the apertures so that the water pressure on the top and bottom of the plate will be susbstantially equalized. Thus, the plate 22 moves down with less resistance than on the upward movement and thereby preventing the inducing of a downward flow.

The illustrative embodiment of FIG. 3, instead of a valved plate as in FIG. 1, employs a propeller device to move stagnant masses of water from the depth upwardly to the surface of the water.

In this instance, the buoy 14a is likewise freely movably supported on a mooring mast 16a which extends into the water and has its lower end connected to a mooring weight 26a at or near the bottom of the body of water.

A stirring device 38 is suspended from the buoy 14a substantially midway between the buoy and the mooring weight 26a which is comprised of a rotatable sleeve 40 positioned around the mooring mast 16a which has internal helical threads 42 to mate with external threads 44 provided on the mooring mast 16a. The sleeve 40 has an upper flange 46 secured thereto in such a way as not to rotate with the sleeve 40 but adapted to move freely on the mast 16a. The upper flange 46 is connected by cables 48 to the buoy 14a. The sleeve also has a similar lower flange 50 which is also secured to the sleeve in such a manner so as not to rotate with the sleeve but to be freely movable along the mast 16a. The lower flange 50 is connected by cables 52 to the mooring weight 26a by means of pulleys 54 attached to the underside of the flange 50 over which the cables 52 extend and which have counterweights 56 attached to the free ends thereof.

Attached to the sleeve 40 are a number of propeller blades 58 circumferentially arranged therearound. The propeller blades 58 are individually adjustably attached to the sleeve 40 by means of helical slots 60 into which the roller type head 62 of the blades extend. By this arrangement, upon axial movement of the sleeve 40 along the threaded portion 44 of the mast 16a the sleeve will be forced to rotate, by which the propeller blades will be moved from one end of the slot to the other causing the blades to be rotated around their individual axis from a horizontal position of the blades as in FIG. 5 to a vertical position of the blades as in FIG. 4 or vice versa.

Figure 4:
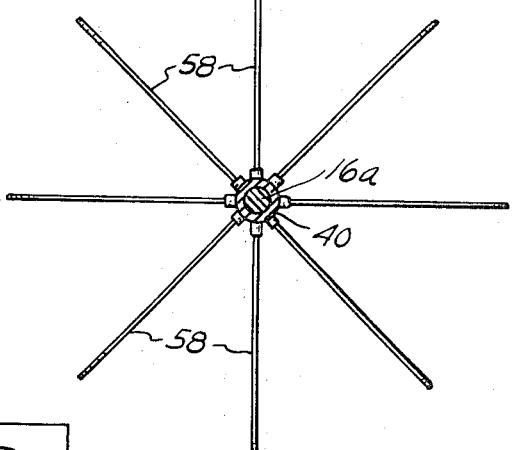
FIG. 4 shows the position of the propeller blades of the device in FIG. 3 when the device moves downwardly.
Figure 5:
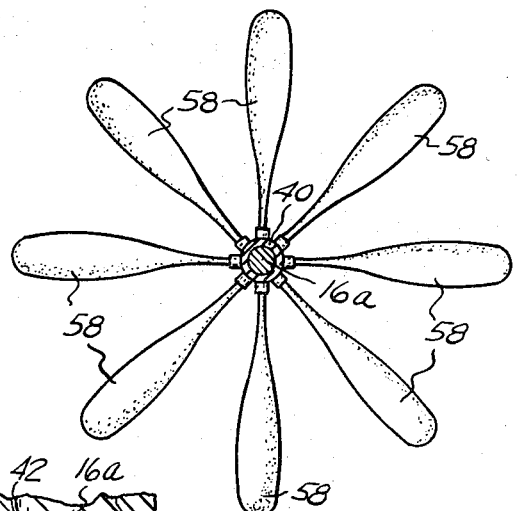
FIG. 5 shows the position of the propeller blades of the device in FIG. 3 in upward motion.
Figures 6, 7:
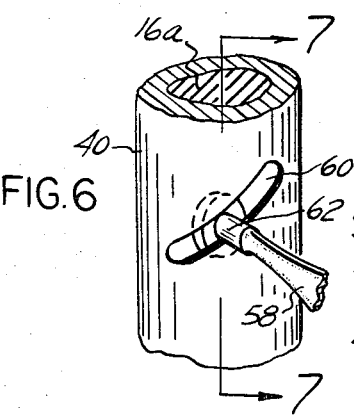
FIG. 6 is a separate detail view of the blade connection to the rotatable collar.
FIG. 7 is a cross section through FIG. 6 along line 7—7 thereof.

This device operates in the following manner: As the buoy 14a is being raised by action of the waves the cables 48 draw the sleeve 40 upwardly with it causing the sleeve to be rotated on the threads 42, 44. This causes initial individual rotation of the propeller blades 58 around the axis to move them into a horizontal position as shown in FIG. 5 and by continuing upward movement of the sleeve 40 causes rotation of the complete propeller assembly around the mast 16a which action tends to move water upwardly with it, inducing a vertical upward flow to displace stagnant masses of water from the depth of the body of water to the surface. Upon downward movement of the buoy 14a by action of the waves the cables 48 slacken which cause the counterweights 56 at the lower end of the sleeve 40 to draw the sleeve downwardly along the mast 16a by which the sleeve 40 is rotated on the threads 42, 44 in the opposite direction. This causes the propeller blades 58 to move in the other direction in the slots to rotate the blades around their individual axis in a vertical position as shown in FIG. 4 to reduce the resistance upon a downward movement so as not to produce a downward flow.

Thus, this device functions in the same manner as the device in FIG. 1 to move substrata of stagnant water masses to the surface. Obviously, various modifications may be made in the devices of FIGS. 1 and 3 as, for instance, the threads 42, 44 in FIG. 3 could be replaced by a ball nut or the device could be provided with an overrunning means to provide rotation of the propeller blade assembly only upon upward movement of the device. Furthermore, the propeller blades in FIG. 3 could be made to collapse upon downward movement of the device to further reduce the downward resistance. Similarly, the valve plate device of FIG. 1 could be modified in many ways. Alternately, as pointed out before, various other well known wave action devices could be employed to accomplish the present novel method.

SUMMARY

The present novel method of aerating still bodies of water provides the use of a wave action aerator to produce an upward pumping action in relatively still bodies of water to eliminate the stratification of the water which results in cold masses being disposed at the bottom of the body for a long period of time, out of contact with the oxygen which is introduced at the surface.

In essence, the device comprises a buoy floating on the top of the body of water where it is subjected to wave action. The buoy is connected by cables to a stirring device suspended at some point between the bottom and top of the body of water. The stirring device has such a configuration that, when it is lifted as a result of the buoy being raised by wave action, it tends to move water upwardly by inducing a vertical flow. When the buoy lowers the stirring device it moves downwardly with less resistance as a result of its configuration thereby reassuming its initial lower position without inducing a downward water movement. The stirring device may have the configuration of a propeller so that it rotates upon either its upward or downward motion in order to achieve the desired upward motion of the water. It may alternately comprise a valve type surface so that it greatly resists the water on the upward motion and offers no resistance on its downward motion. The entire device is anchored by cables extending downwardly from the stirring device to a suitable mass or weight resting on the bottom or near the bottom of the body of water or suspended at a very low level.

The present invention may be embodied in other certain forms without departing from the spirit and essential characteristics thereof, therefore the present embodiment is to be considered in all respects as illustrative only and not restrictive, the scope of the invention being indicated by the appended claims rather than by the foregoing description.

What is claimed is:

1. A method of aerating a relatively still body of water comprising stirring substratas of said body of water at a point substantially below the surface of said body of water to introduce a vertical upward flow within said body of water to pump said substratas toward the surface for introduction of oxygen therein including the provision of stirring means suspended below said surface of said body of water at a point substantially closer to the bottom of said body of water than to said surface, and means associated with said stirring means to operate said stirring means to induce an upward water flow, said last means comprising a buoy floating on the surface of said body of water and connected to said stirring means to transfer the wave motion of said buoy to said stirring means.

2. A method of aerating a relatively still body of water comprising stirring substratas of said body of water at a point substantially below the surface of said body of water to introduce a vertical upward flow within said body of water to pump said substratas toward said surface for introduction of oxygen therein, utilizing stirring means suspended below said surface of said body of water at a point substantially closer to the bottom of said body of water than to the surface, said stirring means comprising a mechanical device anchored near the bottom of said body of water adapted for vertical movement within said body of water in such a way as to offer substantial resistance on the upward movement but substantially no resistance on the downward movement, and means associated with said stirring means to operate said stirring means to induce an upward water flow.

3. In the method defined in claim 2, said mechanical device comprising a surface having valve means adapted to close upon upward motion of said device and to open upon downward motion of said device.

4. In the method defined in claim 2, said mechanical device comprising rotatable propeller means.

References Cited

UNITED STATES PATENTS

| | | | |
|---|---|---|---|
| 3,193,260 | 7/1965 | Lamb | 61—1 |
| 3,365,178 | 1/1968 | Bood | 61—1 |
| 3,373,821 | 3/1968 | Sare | 61—1 |
| 3,452,966 | 7/1969 | Smolski | 61—1 |

PETER M. CAUN, Primary Examiner